United States Patent [19]

Leiber

[11] 4,100,792

[45] Jul. 18, 1978

[54] APPARATUS FOR THE TESTING OF A BRAKE SYSTEM

[75] Inventor: Heinz Leiber, Leimen, Germany

[73] Assignee: Robert Bosch GmbH, Stuttgart, Germany

[21] Appl. No.: 773,254

[22] Filed: Mar. 1, 1977

[30] Foreign Application Priority Data

Mar. 18, 1976 [DE] Fed. Rep. of Germany ....... 2611369

[51] Int. Cl.² .............................................. G01L 5/28
[52] U.S. Cl. ......................................... 73/39; 73/121
[58] Field of Search ........................... 73/121, 39, 168

[56] References Cited

U.S. PATENT DOCUMENTS

| 3,772,914 | 11/1973 | Pohl et al. | 73/121 |
| 3,937,074 | 2/1976 | Burkett | 73/121 |
| 3,958,454 | 5/1976 | Rasch | 73/121 |

*Primary Examiner*—Jerry W. Myracle
*Attorney, Agent, or Firm*—Edwin E. Greigg

[57] ABSTRACT

The invention relates to improvements in testing apparatus for brake systems including a diagnostic unit provided with a brake cylinder having a selectively switchable magnetic valve adapted for assembly with an outlet line leading to said cylinder. The magnetic valve actuates a double-acting valve that controls the outlet line and a return line and a sensor associated with said magnetic valve is arranged to operate the same under varying pressure conditions.

5 Claims, 4 Drawing Figures

APPARATUS FOR THE TESTING OF A BRAKE SYSTEM

BACKGROUND OF THE INVENTION

The invention relates to an apparatus for the testing of a brake system which includes a brake pressure source, a brake line, and at least one brake cylinder and further contains at least one brake pressure control valve mechanism which is arranged to release, in one of its attitudes, a pressure into a pressureless outlet line. This testing apparatus further includes a pressure sensor, a controller serving to effect differing pressure conditions and pressure courses by the actuation of valves and a discriminator which compares the actual pressures gauged by means of the pressure sensor with the optimal pressures programmed for specific time points on the basis of the given valve actuation by the controller. The discriminator reveals the condition of the brake system based upon the comparison made by the apparatus.

A generally similar testing apparatus is disclosed in the German laid-open application 2,342,307, especially in FIG. 4 thereof. In that apparatus, the pressure sensor is connected ahead of the valve controlling the brake pressure in the system.

OBJECT AND SUMMARY OF THE INVENTION

It is the object of the present invention to improve the known testing apparatus so as to avoid the above-cited disadvantage, without requiring an additional one pressure sensor.

Accordingly, the principal object of this invention is achieved by the fact that the pressure sensor is associated with the outlet line of the brake system and that a magnetic valve which is positioned in the return line downstream of the pressure sensor is selectively switchable, during the testing process, either to block the return line or to open its passage. With this arrangement, the blocking of the return line by means of the magnetic valve permits the gauging of pressure conditions at the wheel brake cylinder and the switching of the magnetic valve to open the return line passage provides for a pressure decrease via the valve mechanism.

The invention can be utilized either with hydraulic or with pneumatic systems. In a hydraulic system, the outlet line becomes the return line to the storage reservoir. The invention is utilizable both with externally powered systems as well as with power-assisted systems.

The pressure sensor and the ancillary valve together with the actuating magnet are preferably embodied as a diagnostic unit that is attachable for the purpose of the testing to a return line that is adapted to receive this unit. The diagnostic unit is preferably designed in such a manner that the junction at the return line is normally closed by a compound double-acting valve which can be reciprocated axially and then brought into engagement with a further valve seat where it blocks the return line. The double-acting valve also contains a spring loaded axially disposed check valve.

A further object of the invention is to provide an apparatus that has a dual function for the double-acting valve and may be moved into its second attitude by merely mounting the diagnostic attachment in the manner disclosed later herin at which time the actuation of the electromagnet pushes the spring loaded check valve to an open position, or that the mounting of the diagnostic attachment pushes the spring loaded check valve open and that the double-acting valve is moved to its two functional attitudes by means of the electromagnet. In air pressure systems, the double-acting valve can alternatively be a part of the mountable diagnostic sensor, since there the momentary escape of the pressure medium during the attaching process does not provide a problem.

Other objects and advantages of the present invention will be more readily apparent from a further consideration of the following detailed description of the drawings illustrating a preferred embodiment of the invention, in which:

DESCRIPTION OF THE PREFERRED EMBODIMENT

Figures 1, 2:
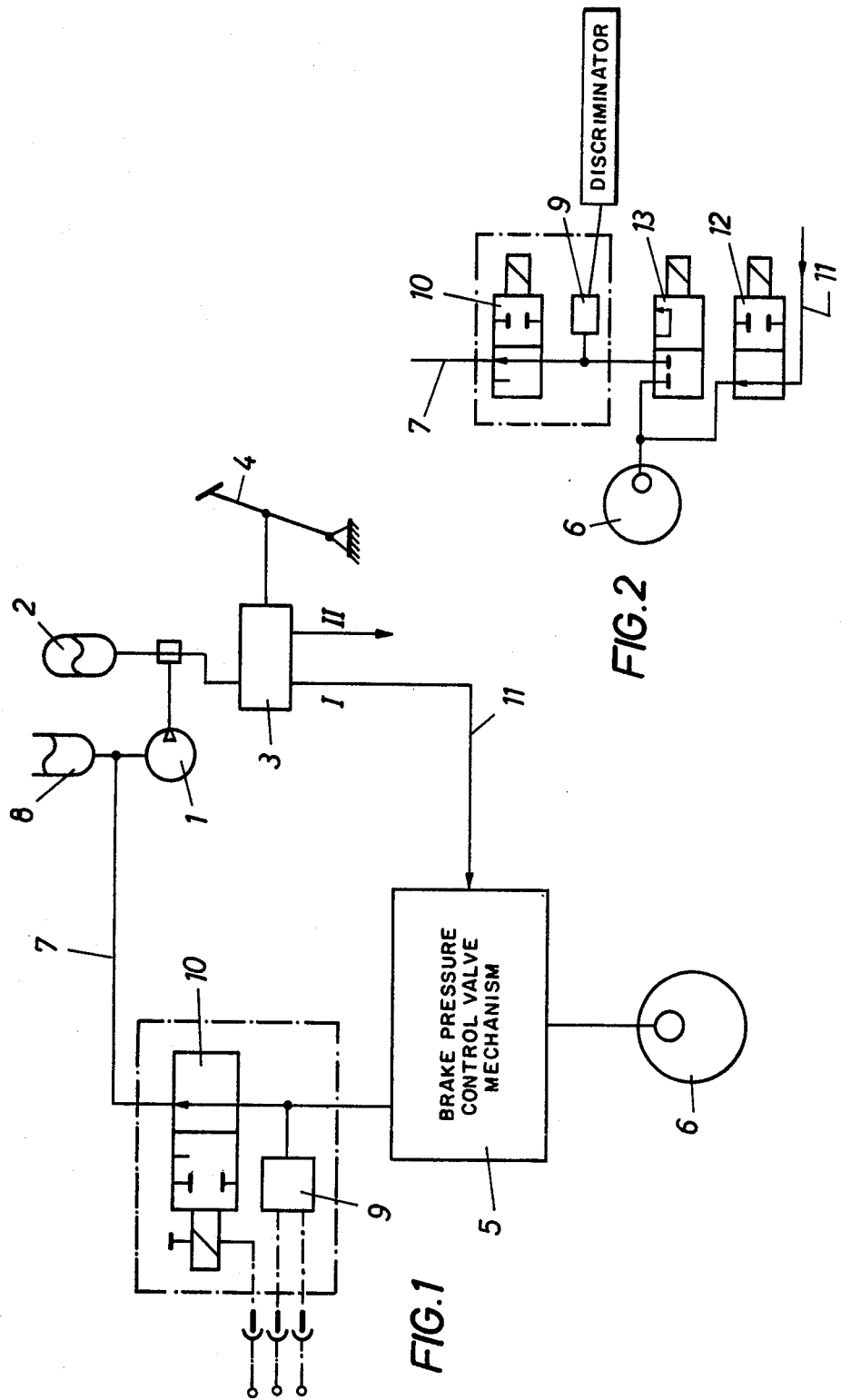
FIG. 1 shows schematically the principle of the invention.
FIG. 2 shows schematically the brake pressure control unit.

Turning now to the drawings, FIG. 1 shows a pump 1 with its appertaining pressure reservoir 2 and a pressure conrol valve 3 actuatable by means of the pedal 4. A brake pressure control valve 5 which is arranged to vary the pressure on the basis of the dynamic behavior of the wheels is inserted into the brake line 11 that leads to a wheel brake 6. A return line 7 connects the brake pressure control valve 5 to the storage container 8.

A pressure sensor 9 and an electromagnetic valve 10 with which the return line 7 can be blocked are inserted into the return line 7 for the testing of the hydraulic system.

FIG. 2 shows a portion of FIG. 1, including the return line 7, the brake line 11, the brake 6, the pressure sensor 9 and the test valve 10, as well as a detailed representation of the brake pressure control valve 5 comprising an inlet valve 12 and of an outlet valve 13.

Figure 3:
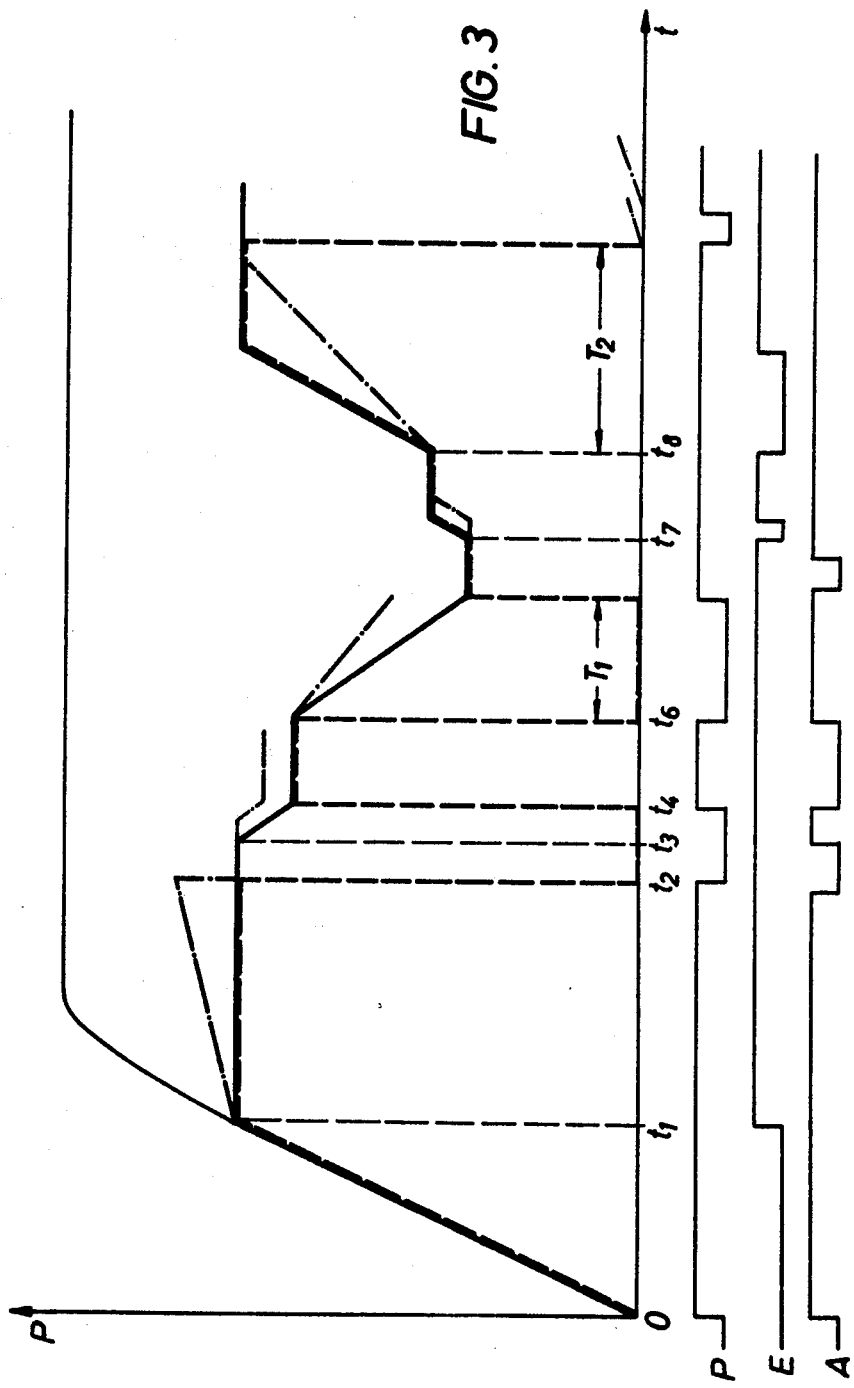
FIG. 3 is a timing diagram of the pressure course during the testing phase.

The operation of the mechanism of FIG. 2 will be best understood by referring to the timing diagram of FIG. 3. At $t = 0$, pressure is admitted via the valve 3. Since the outlet valve 13 and the testing valve 10 are actuated as of this time point (see control signals A and P), the pressure increases in like manner at the wheel brake (solid line) and at the pressure sensor (dashed line). At $t1$ the inlet valve 12 is actuated (see signal E). The pressure at the pressure sensor could now increase only if the valve were leaking and if this happened the dash-dotted course would then ensue. A leak thus takes place until $t2$, and it is monitored by means of a discriminator, not shown, connected to the pressure sensor. The testing valve 10 is deactivated at $t2$. The outlet valve 13 has already been deactivated shortly prior to $t2$. The ressure at the pressure sensor 9 thus falls to zero, and since at $t3$ the outlet valve 13 is once again opened, the pressure at the brake falls as well. At $t4$ the valve 10 is once again closed, and since the outlet valve 13 is still briefly open, the pressure at the pressure sensor 9 now approximates the pressure at the brake. Inferences regarding the switching times of the outlet valve 13 (see the dash-dotted course) can now be made on the basis of that given pressure magnitude.

The valves 10 and 13 are opened approximately at t6, thus lowering the pressure. In this manner, the determination can be made whether the pressure has dropped to a predetermined value, in the time T1, via the outlet valve 13, that is, whether the pressure decrease progresses with sufficient rapidity. Further test may be made at t7 whether the inlet valve 12 switches fast enough, and at t8 whether it causes a sufficiently rapid pressure rise in the time T2. The testing apparatus for this functional test can be constructed similar to that of the German published application 2,342,307, although more pressure thresholds are required by that device.

Figure 4:
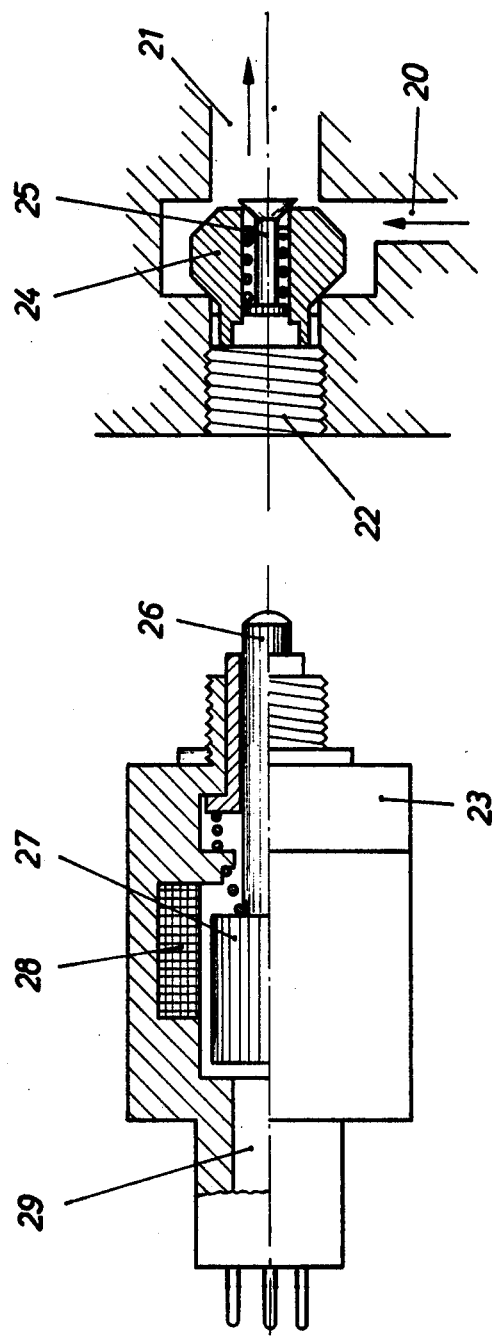
FIG. 4 shows a cross-sectional view of one preferred embodiment of the invention.

FIG. 4 depicts a constructional embodiment of the testing mechanism. The right part of the drawing shows a section of the return line 7 whose junction 20 connects to the outlet valve 13, and whose junction 21 connects to the storage container 8. It is to be assumed that the diagnostic attachment 23 is threaded into the junction 22. The opening 22 is normally closed by means of the doubleacting valve 24 that is pushed to the right by the mounting of the threaded diagnostic attachment, and in its right position the double-acting valve 24 then blocks the return line 7. The double-acting valve 24 contains a spring loaded axially disposed check valve 25 that is opened by means of the push rod 26 through the medium of the electromagnet 27, 28. The electromagnet 27, 28 and the spring loaded check valve 25 together form the valve 10. In contrast to the condition in FIG. 2, the actuation of the valve of FIG. 4 opens the passage through it. The attachment 23 also contains a pressure sensor 29 which is exposed to the pressure at the inlet junction 20 and thus gauges the pressure therein.

The foregoing relates to a preferred exemplary embodiment of the invention, it being understood that other embodiments and variants thereof are possible within the spirit and scope of the invention, the latter being defined by the appended claims.

What is claimed is:

1. Apparatus for the testing of a brake system comprising:
    a brake cylinder having an outlet line and a return line;
    a dual actuated brake pressure control valve mechanism connected to said outlet of said brake cylinder;
    a pressure sensor connected to said return line downstream of said control valve mechanism;
    a discriminator connected to said pressure sensor for comparing actual pressures gauged by said sensor with an optimal pressure; the improvement wherein:
    a selectively switchable double-acting electromagnetic valve is connected in said return line downstream of said sensor, said double-acting valve serving to open and close said return line; whereby pressure conditions in said brake cylinder can be gauged and said double-acting valve opened to permit a pressure decrease in said dual actuated brake pressure control valve mechanism.

2. The apparatus as defined by claim 1, in which the said pressure sensor and said double acting valve are positioned in a utilized housing that includes attachment means for securing to said outlet line.

3. The apparatus as defined by claim 2, in which said pressure sensor is disposed axially of said housing and at an end opposite thereof from the attachment means.

4. The apparatus as defined by claim 1, in which said double-acting valve further includes an axially disposed spring loaded relief valve.

5. The apparatus as defined by claim 4, in which said spring loaded relief valve is actuated by said magnetic valve.

* * * * *